United States Patent [19]
Dirksing et al.

[11] Patent Number: 4,873,100
[45] Date of Patent: Oct. 10, 1989

[54] BISTABLE EXPANDABLE BOTTLE

[75] Inventors: Robert S. Dirksing, Cincinnati; Richard M. Girardot, Wyoming; Theodore P. Merz, Cincinnati, all of Ohio

[73] Assignee: The Procter & Gamble Company, Cincinnati, Ohio

[21] Appl. No.: 38,794

[22] Filed: Apr. 15, 1987

[51] Int. Cl.⁴ .......................... B65D 1/40; B65D 1/44
[52] U.S. Cl. .................................... 426/111; 215/1 C; 215/311; 215/100 A; 220/202; 220/94 A; 426/112; 426/115
[58] Field of Search ...................... 426/111; 150/55; 215/1 C

[56] References Cited

U.S. PATENT DOCUMENTS

| | | | |
|---|---|---|---|
| 132,875 | 11/1872 | Stoessiger . | |
| D. 286,856 | 11/1986 | Anscomb | D9/301 |
| D. 292,555 | 11/1987 | Chesterfield | D7/301 |
| 1,627,851 | 5/1927 | Kroll . | |
| 1,885,757 | 11/1932 | Orlopp . | |
| 1,988,091 | 1/1935 | Schumacher . | |
| 2,667,422 | 1/1954 | Kauffman . | |
| 2,673,806 | 3/1954 | Colman . | |
| 2,681,284 | 6/1954 | Graves . | |
| 2,685,316 | 8/1954 | Krasno | 150/0.5 |
| 2,791,367 | 5/1957 | Mefford | 229/41 |
| 2,863,305 | 12/1958 | Shepherd | 62/530 |
| 2,886,084 | 5/1959 | Davison | 150/0.5 |
| 3,012,695 | 12/1961 | Lerner | 122/129 |
| 3,083,877 | 4/1963 | Gash | 150/55 |
| 3,143,429 | 8/1964 | Swanson et al. . | |
| 3,163,544 | 12/1964 | Valyi . | |
| 3,172,577 | 3/1965 | Hartung | 222/206 |
| 3,220,544 | 11/1965 | Lovell | 206/46 |
| 3,261,458 | 7/1966 | Nibecker | 206/47 |
| 3,301,293 | 1/1967 | Santelli | 150/0.5 |
| 3,340,869 | 9/1967 | Bane | 128/2 |
| 3,384,258 | 5/1968 | Singier | 215/100 |
| 3,387,732 | 6/1968 | Jellies | 150/55 |
| 3,390,821 | 7/1968 | Mullan | 222/212 |
| 3,434,589 | 3/1969 | Valtri et al. | 206/46 |
| 3,441,172 | 4/1969 | Dike | 220/94 |
| 3,473,524 | 10/1969 | Drewe | 128/2 |
| 3,474,844 | 10/1969 | Lindstrom et al. | 150/55 |
| 3,506,163 | 4/1970 | Rauh et al. | 222/212 |
| 3,557,788 | 1/1971 | Swartz | 150/55 |
| 3,918,582 | 11/1975 | Wallace | 206/362 |
| 3,920,226 | 11/1975 | Walt | 259/72 |
| 3,926,341 | 12/1975 | Lhoest | 150/55 |

(List continued on next page.)

FOREIGN PATENT DOCUMENTS

| | | | |
|---|---|---|---|
| 293596 | 10/1962 | Australia | 150/55 |
| 688612 | 6/1964 | Canada | 150/55 |
| 2038069 | 2/1972 | Fed. Rep. of Germany | 150/55 |
| 2042593 | 3/1972 | Fed. Rep. of Germany | 150/55 |
| 1208104 | 12/1958 | France | 150/55 |
| 1288900 | 2/1961 | France | 150/55 |
| 706406 | 5/1966 | Italy | 150/55 |
| 87739 | 5/1956 | Norway | 150/55 |
| 411684 | 11/1966 | Switzerland | 150/55 |
| 1117552 | 6/1968 | United Kingdom | 150/55 |

OTHER PUBLICATIONS

Publication: "Hostalen PP"–"K–Nachrichten, Verkauf-Kunststoffe, Marketing–Koordination" 1982, p. 75; 150/55.
Modern Packaging 11/59 p. 161 426/111.
Modern Packaging 10/48 p. 140 426/111.
A promotional brochure entitled "Breakthroughs in Bellow Design", Copyright 1987 W. N. Touzani.

*Primary Examiner*—Steven Weinstein
*Attorney, Agent, or Firm*—E. Kelly Linman; John V. Gorman; Richard C. Witte

[57] ABSTRACT

A bistable expandable bottle preferably including a concentrated material to be diluted, said bottle being comprised of convex shaped bellows when in its expanded condition, said bottle also including opposed handle means for facilitating the extension of the bottle from its collapsed to its expanded condition. In a preferred embodiment a self-venting closure is also employed to seal the orifice in said bottle to permit extension of the bottle from its collapsed to its expanded condition without loosening or removing of the closure.

46 Claims, 8 Drawing Sheets

U.S. PATENT DOCUMENTS

| | | | |
|---|---|---|---|
| 3,938,514 | 2/1976 | Boucher | 128/232 |
| 3,939,887 | 2/1976 | Scarnato | 150/0.5 |
| 3,939,888 | 2/1976 | Scarnato | 150/0.5 |
| 4,068,778 | 1/1978 | Wilson | 220/66 |
| 4,147,279 | 4/1979 | Matsui | 150/55 |
| 4,377,191 | 3/1983 | Yamaguchi | 150/55 |
| 4,394,906 | 7/1983 | Hollenbeck | 426/111 |
| 4,456,134 | 6/1984 | Cooper | 426/111 |
| 4,492,313 | 1/1985 | Touzani | 215/1 |
| 4,526,296 | 7/1985 | Berger et al. | 222/107 |
| 4,645,078 | 2/1987 | Reyner | 150/55 |
| 4,773,458 | 9/1988 | Touzani | 222/107 |
| 4,775,564 | 10/1988 | Shriver et al. | 222/107 |

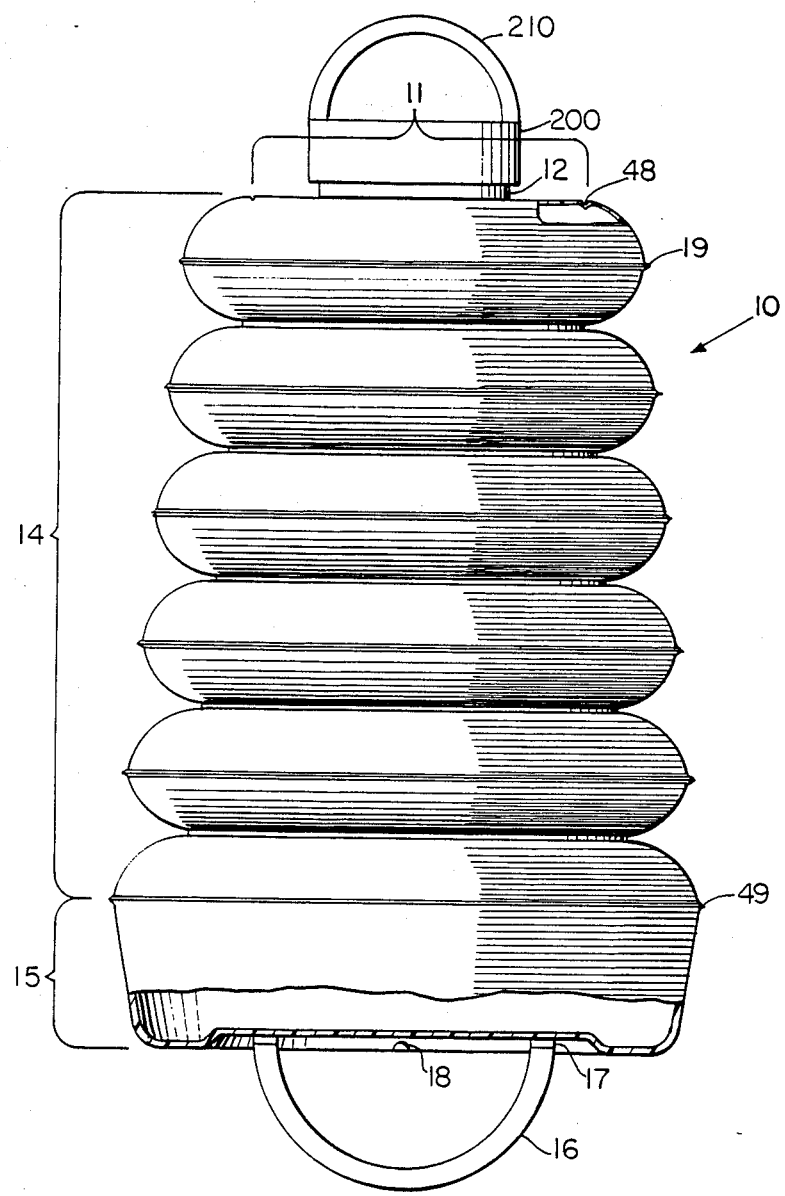

BISTABLE EXPANDABLE BOTTLE

BACKGROUND OF THE INVENTION

1. Field of the Invention

The present invention relates to bistable expandable plastic bottles for storing and delivering concentrates such as fruit juices while the bottle is in a collapsed condition, thereafter expanding the bottle, reconstituting or diluting the concentrates in the expanded bottle and serving or dispensing the diluted or reconstituted product directly from the same expanded bottle.

The present invention further relates to such bottles and concentrates which are stored in a freezer prior to use, and which can be immediately expanded and diluted or reconstituted for immediate use upon removal from the freezer.

2. Description of the Prior Art

Currently, the reconstitution of frozen juice concentrate is an unpleasant task. The frozen concentrate is sold in either fiber board or plastic cans. The frozen concentrate requires at least partial thawing to be removed from the container. Once removed, the concentrate must be placed in another container, a prescribed amount of water added, and then thoroughly mixed. All of this requires substantial time, effort, and anticipation if the reconstituted product is to be consumed at the rather hectic breakfast setting.

Many expandable and bellows containers have been described in the prior art and some in the context of expansion for the purpose of dilution or reconstitution of a concentrate. For example, U.S. Pat. No. 3,434,589 issued to Valtri on Mar. 25, 1969 discloses an expandable container to carry medical tablets. The user expands the container to receive water and dissolve the tablet for consumption. The device is shown collapsed in FIGS. 4 & 5 in a fashion similar to a compression spring which would cause substantial stresses to be placed upon the structure. The materials described for construction are polymers which will over time creep under stress. As a result, the container will not attain the volume and shape it originally exhibited when it is expanded after an extended period of storage in its collapsed condition.

U.S. Pat. No. 3,163,544 issued to Valyi on Dec. 29, 1964 describes in one embodiment a means for using a container of pleated or bellows shape to reconstitute frozen products such as juice. However, the patent does not describe any means by which the container supports itself after expansion other than to be placed inside a more substantial container.

Several patents (for example U.S. Pat. No. 3,473,524 issued to Drewe on Oct. 21, 1969) disclose means to provide bistable or over-center bellows action of devices comprised of polymeric materials. The bistable action causes the stresses to be released at either stable condition and hence creep of the polymeric material is minimized.

The collapsible bottle described in U.S. Pat. No. 4,492,313 issued to Touzani on Jan. 8, 1985 employs a latching bellows which is comprised of straight legged conical portions of which the lower inwardly directed portion is substantially smaller and at a much greater angle to the axis of the bottle than the upper outwardly directed portion. The stated purpose of the collapsible bottle is to reduce volume above carbonated beverages when the contents are partially used in order to minimize carbonation loss. The latching geometry described is intended to resist expansion once the bottle is collapsed.

OBJECTS OF THE INVENTION

Accordingly, it is an object of the present invention to provide an improved bistable expandable bottle which is supplied to the user in a collapsed condition and contains a quantity of concentrate so that the user can expand the bottle, dilute the contents, and dispense the diluted product directly from the expanded bottle.

It is a further object of the present invention to provide a means to facilitate the expansion of an expandable bottle, said means preferably comprising opposing handles generally aligned with the vertical axis of the bottle.

It is yet another object of the present invention to provide a self-venting closure which does not require removal to permit the inspiration of air into the expanding volume upon extension of an expanded bottle.

It is still a further object of the present invention to provide an improved expandable bottle which is suitable for storing and delivering in a compact form a quantity of highly concentrated fruit juice. The expandable bottle can be taken directly from the freezer, immediately expanded, liquid can be added to dilute and reconstitute the juice and the reconstituted juice can be served for consumption directly from the expanded container. Any unconsumed contents can be stored in the expanded bottle.

SUMMARY OF THE INVENTION

In a particularly preferred embodiment, the present invention comprises an expandable bottle which, in its expanded condition, exhibits a continuous sidewall portion comprised of outwardly convex bellows. The primary use of the expandable bottle is as a container for delivering, preparing and serving a consumable material such as orange juice from concentrate without the need for an auxillary container. The outwardly convex shaped bellows impart increased axial stiffness to the expanded bottle due to: (a) the improved distribution of plastic material which occurs during the molding process; and (b) an alignment of the material of the individual bellows portions or legs of the fully expanded bottle to a more axial direction as the distance from the axis of the bottle toward the major diameter of the bellows increases.

The present invention also provides a means to improve the innermost hinge point or points at the minor diameter of the bellows to relieve stresses in the collapsed condition so that the innermost hinge point or points do not retain a bending movement. In addition, the improved innermost hinge ring provides clearance so that the folds of the bellows legs do not interfere with the adjoining folds when the bottle is in its collapsed condition. Using the improved hinge ring in conjunction with complementary adjoining bellows legs permits highly efficient compression of the bottle into its collapsed condition.

Further, the present invention provides a means for defining a hinge point at the major diameter of each bellows so that a clean collapsed folding of the bottle is accomplished.

Further still, the present invention provides means for extending any expandable bottle, regardless of configuration. In a particularly preferred embodiment, said means for expanding the bottle includes opposing handles secured to opposing ends of the bottle.

Finally, the present invention provides improved closure means for sealing the orifice in any expandable bottle, said closure means including a self-venting feature which will permit expansion of the bottle without need to loosen or remove the closure means from the bottle.

BRIEF DESCRIPTION OF THE DRAWINGS

While the specification concludes with claims particularly pointing out and distinctly claiming the present invention, it is believed the present invention will be better understood from the following description in conjunction with the accompanying drawings in which:

FIG. 1 is a simplified elevation view of a preferred bistable expandable bottle of the present invention shown in its expanded condition:

DESCRIPTION OF THE PREFERRED EMBODIMENTS

Figure 1A:
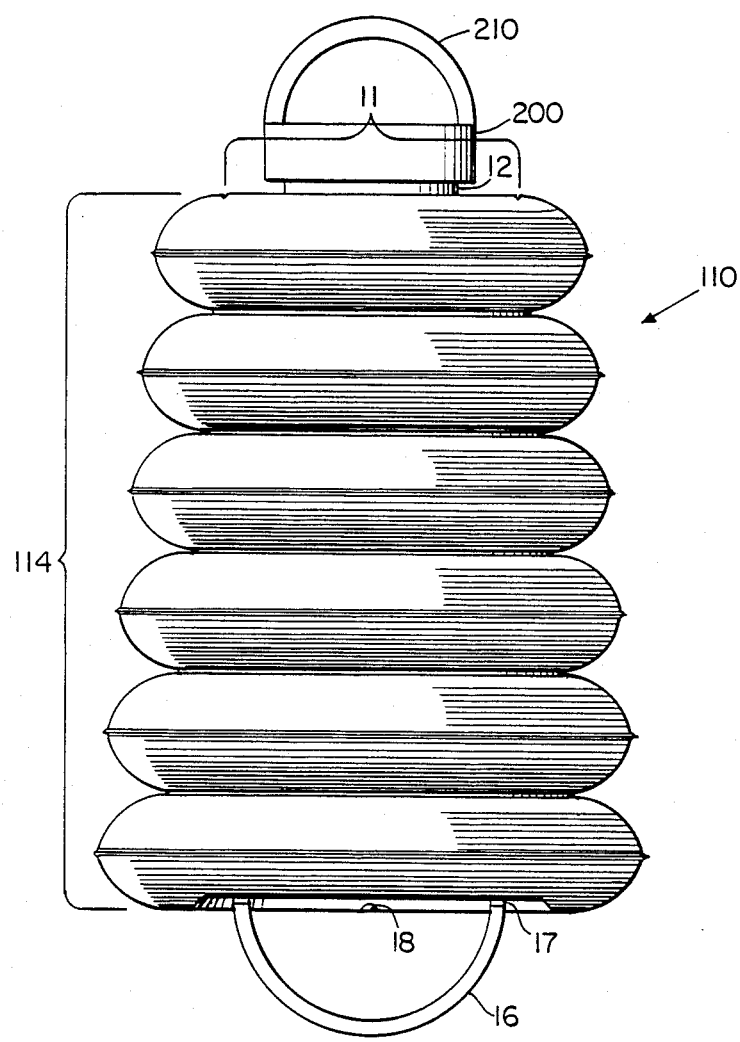
FIG. 1A is a simplified elevation view of an alternative embodiment of a bistable expandable bottle of the present invention, also shown in its expanded condition.

In FIG. 1 a fully expanded bottle of the present invention, generally denoted by 10, includes an upper portion 11 having a central neck 12 which contains an orifice for introducing concentrated material into the bottle and for dispensing diluted material from the bottle. The neck 12 preferably includes means, such as screw threads (not shown), for securing a normally closed self-venting closure or cap 200. Although the present invention is described in terms of a bottle, the bottle of the present invention is not limited to a particular form, i.e, a comparatively narrow neck or mouth. The orifice may be of any desired size, large or small. The self-venting closure or cap 200 which seals the orifice in the bottle may be atttached and detached from the bottle 10.

The cylindrical bottle is is preferably blow molded from a material such as polyethylene with a resilient, continuous sidewall 14 comprised of generally circular, outwardly convex bellows which extend along the majority of said sidewall 14. In the illustrated embodiment, bottle 10 also includes a lower reservoir portion 15, which accommodates the concentrate prior to expansion.

In one aspect, the present invention provides improved means for extending any expandable bottle, regardless of configuration. Said means preferably comprises a pair of opposing handles or pull straps secured either directly or indirectly to opposite ends of the bottle. The use of opposing handles or pull straps is highly preferred over the pinching or grasping mode which would be required without the opposing handles or pull straps because it reduces the muscle exertion of the forearm and fingers. The expansion process using the opposing handles or pull straps requires primarily the exertion of the upper arm and shoulder muscles which are generally stronger than the finger muscles used to exert a squeezing force with the hand.

Bottle 10 shown in FIG. 1 includes an integral handle 16. Handle 16 is preferably formed from the lower part on the parison in the pinch-off operation of the blow molding process. Handle 16 preferably includes a pair of hinge straps 17 of reduced cross-section to distribute stress at their junctures with the base of bottle 10. The hinge straps 17 permit folding of the handle 16 into a stowed position in the base of bottle 10. Handle 16 preferably snaps under projection 18 which retains handle 16 in the stowed position. This permits the bottle 10 to be placed on a horizontal surface without rocking.

Normally closed self-venting cap 200 also includes a pull strap 210 which is attached or integrally molded thereto. The opposing handle 16 and pull strap 210 facilitate easy expansion of bottle 10 by providing finger holds during the expansion process.

A fill line 19 is preferably formed into the surface of the bottle to indicate to the user the correct level of diluent when diluting or reconstituting the concentrate. The actual location of any given fill line will, of course, depend on the nature of the concentrate to be diluted and the need for head space within the filled bottle to facilitate shaking, mixing, pouring, etc. Multiple fill lines may be provided to permit different degrees of concentrate dilution. Various user taste preferences for products such as instant tea may be accommodated by selecting a weak, normal or strong fill line when diluting.

In the expandable bottle embodiment 110 which is illustrated schematically in FIG. 1A, wherein like reference numerals denote like elements, sidewall 114 is comprised of generally circular outwardly convex bellows which extend along the majority of the bottle's height. Expandable bottle embodiment 110 does not include a discrete reservoir portion. In this embodiment, concentrate is housed within the central portion of bottle 110 when the bottle is in its collapsed condition.

Figure 1B:
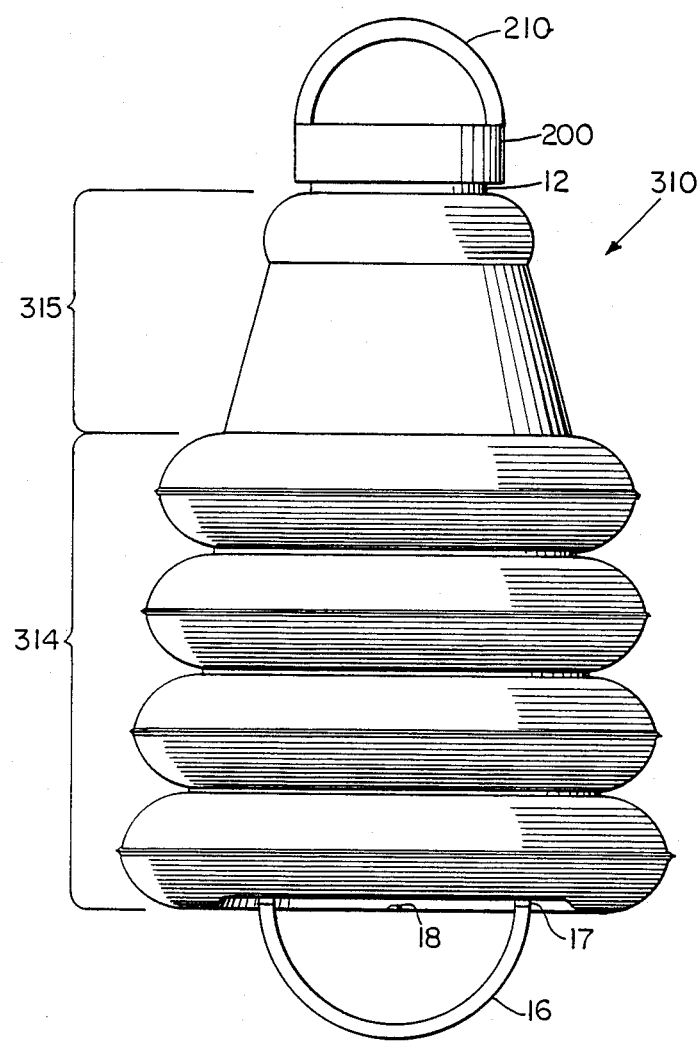
FIG. 1B is a simplified side elevation view of still another embodiment of a bistable expandable bottle of the present invention shown in its fully expanded condition.

The expandable bottle embodiment 310 which is illustrated schematically in FIG. 1B, wherein like reference numerals denote like elements, includes a discrete upper reservoir portion 315 and a sidewall 314 which is comprised of generally circular outwardly convex bellows which extend from the reservoir 315 to the base of the bottle.

Figure 2:
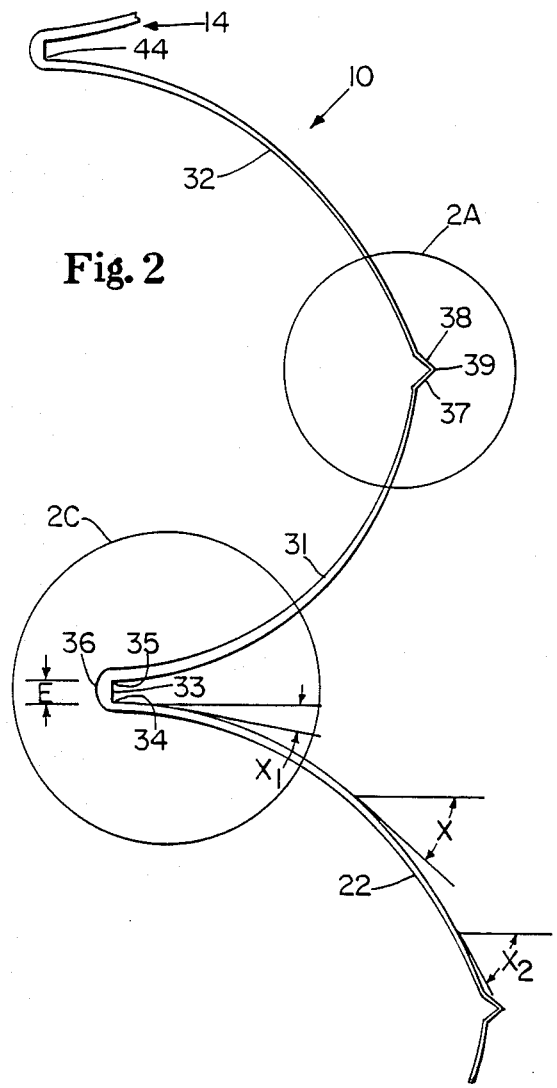
FIG. 2 is a greatly enlarged cross-sectional illustration taken through the bellows portion of the expandable bottle generally shown in FIG. 1.

FIG. 2 illustrates a greatly enlarged cross-sectional view of a section of the sidewall 14 of bottle 10 when the bottle is in its expanded condition. A typical bellows is comprised of a lower bellows portion of leg 31 and an upper bellows portion of leg 32. When the bottle is in its expanded condition, both upper bellows portion or leg 32 and lower bellows portion or leg 31 are generally curved outwardly, i.e., are outwardly convex, from the interior of the bottle 10. Upper bellows portion or leg 32 terminates at the outermost or major diameter with tapered hinge projection 38. Lower bellows portion or leg 31 terminates at the major diameter with tapered hinge projection 37. Hinge projections 37 and 38 join one another at their outermost extremeties to form outermost hinge point 39 substantially coincident with the major diameter of the bellows thus formed.

Figure 2A:
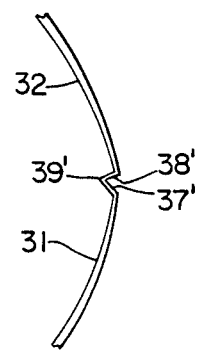
FIG. 2A is a greatly enlarged cross-sectional illustration of an individual bellows employing an alternative outermost hinge point construction, said cross-section being taken at a point corresponding to inset 2A in FIG. 2.

The major diameter or outermost hinge point of each bellows may also be formed by an arrangement which projects inwardly, rather than outwardly, as generally shown in FIG. 2A. In this embodiment, tapered hinge projects 37' and 38' are inwardly directed and join one another at their innermost extremeties to form outermost hinge point 39'.

Figure 2B:
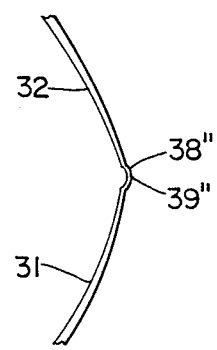
FIG. 2B is a cross-sectional illustration generally similar to that of FIG. 2A, but showing still another outermost hinge point construction, said cross-section also being taken at a point corresponding to inset 2A in FIG. 2.

The major diameter hinge point of the bellows may also be constructed by other means such as a small radius 38" which likewise results in a thinning of the bottle surface at the intended outermost hinge point 39", as generally shown in FIG. 2B. Whatever construction is employed, the thinned outermost hinge point provides a clean fold of each bellows portion at its major diameter.

Figure 5:
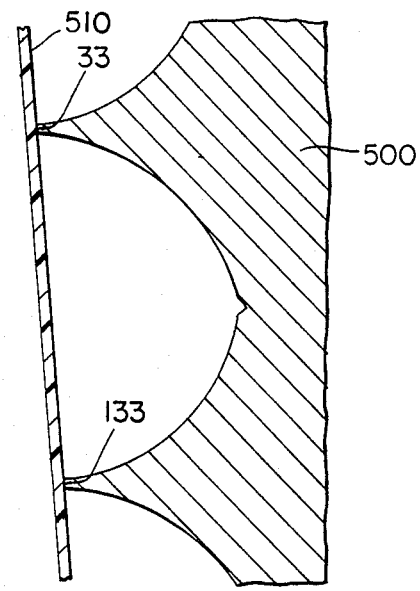
FIG. 5 is a simplified cross-sectional schematic showing the initial point of contact betwen a parison and the innermost surface of a mold cavity utilized to form the bellows portion of a bottle of the present invention.
Figure 5A:
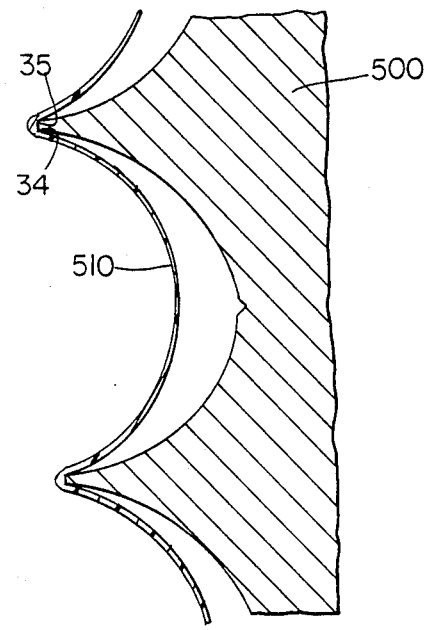
FIG. 5A is a view generally similar to that of FIG. 5, but showing the degree of conformance of the parison to the mold surfaces at a point prior to reaching its final configuration.
Figure 5B:
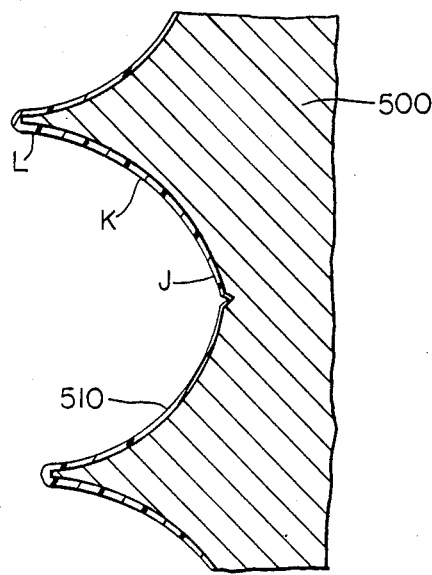
FIG. 5B is a view generally similar to that of FIGS. 5 and 5A, but illustrating the final configuration assumed by the parison inside the bellows portion of the mold.

Lower bellows portion or leg 31 is connected to the adjacent upper bellows portion or leg 22 through a connecting hinge ring portion 36. As one skilled in the art of blow molding will appreciate, the outer surface of the bottle 10 is defined by the interior surface of the blow mold used to form said bottle. In the blow molding process, which is schematically shown in FIGS. 5, 5A, and 5B, the outwardly expanding parison 510 makes initial contact at inner hinge ring surface 33 and similar surfaces within the blow mold 500. In the illustrated embodiment, inner hinge ring portion 36 having an outermost surface 33 comprises a discrete wall segment oriented substantially parallel to the vertical axis of the bottle 10. It is located between points 34 and 35, and its outermost surface 33 is substantially coincident with the innermost or minor diameter of the bellows thus formed. After the parison contacts the mold surface at 33, it continues to balloon about points 34 and 35, as shown in FIG. 5A, which draws the bottle material into a thinner section about innermost hinge points 34 and 35 than the connecting hinge ring portions 36.

The thinned and weakened sections at points 34 and 35 serve as interior hinges for collapsing the bottle. The distance between the innermost hinge points 34 and 35, shown as "E" in FIG. 2, provides clearance for the material of the bellows portions or legs adjacent the innermost hinge points when the bottle is collapsed. Accordingly, the bottle sidewalls, particularly the innermost hinge points, are not subjected to high stress while the bottle is in its collapsed condition.

Figure 2C:
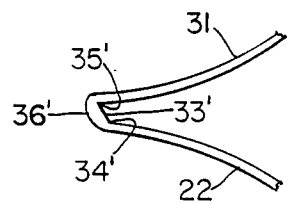
FIG. 2C is a greatly enlarged cross-sectional illustration of an alternative hinge ring construction, said cross-section being taken at a point corresponding to inset 2C in FIG. 2.

In the embodiment illustrated in FIG. 2, inner hinge ring surface 33 describes a generally cylindrical surface relative to the axis of the bottle. As an alternative to the hinge ring construction shown in FIG. 2, the inner hinge ring surface may be formed by a conical or generally curved mold surface. In the embodiment shown in FIG. 2C, hinge ring portion 36' has an outermost surface 33' which is generally conical relative to the axis of the bottle. It joins the lower bellows portion or leg 31 with the upper bellows portion or leg 22 at the minor diameter of the bellows thus formed. As the angle formed at point 35' is more acute than the angle formed at point 34', more thinning occurs at point 35'. Accordingly, the thinned and weakened section at point 35' serves as the primary innermost hinge point for collapsing the bottle. The distance between innermost hinge points 34' and 35' provides clearance for the material of the bellows portions or legs adjacent said innermost hinge points when the bottle is collapsed in a fashion similar to that described for the distance between innermost hinge points 34 and 35 relative to the expandable bottle embodiment shown in FIG. 2.

It can be observed in FIG. 1 that the overall shape of bottle 10 is slightly conical in order to improve hand fit, i.e., it exhibits a slight taper from bottom to top. In this particular embodiment, the overall conical form of the bottle is achieved by employing a multiplicity of bellows, wherein the terminal point of the upper bellows portion at the minor diameter is closer to the center axis of the bottle than the terminal point of its adjacent lower bellows portion at its minor diameter, e.g., point 44 at the minor diameter of upper bellows portion or leg 32, shown in FIG. 2, is closer to the center axis of the bottle 10 than point 35 at the minor diameter of lower bellows portion or leg 31. Additionally, the cross-section of the upper bellows portions or legs (e.g. 32) is slightly longer than the cross-section of the lower bellows portions or legs (e.g. 31). As a result, the bellows exhibiting the largest major and minor diameters is at the lowermost end of the bottle. In the FIG. 2 embodiment, each successive bellows exhibits an identical sidewall cross-section, but a smaller major and minor diameter, respectively, than the bellows immediately below it. This arrangement produces a very compact collapsed bottle condition because the hinge points and bellows portions or legs shingle, as generally shown in FIGS. 3 and 4.

Overall bottle shapes other than conical, such as compound curve or reduced diameter in the midsection (also known as pinch waist), may be achieved by using dissimilar bellows cross-sections or by reversing the pattern of bellows in the mid-section of the bottle. In the latter case, the bellows will shingle in the opposite direction from that shown in FIGS. 3 and 4.

Figure 3:
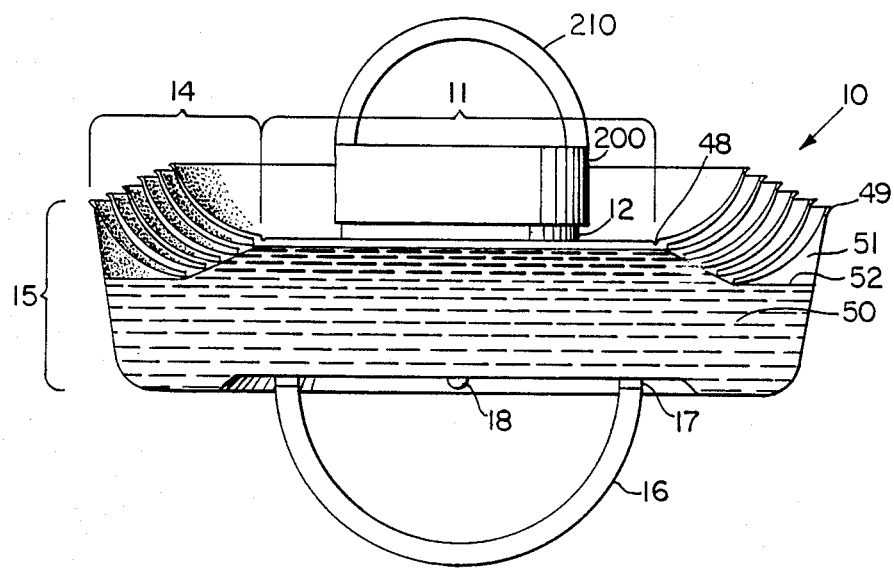
FIG. 3 is a simplified elevation view of the expandable bottle shown in FIG. 1 when said bottle is in its collapsed condition.
Figure 4:
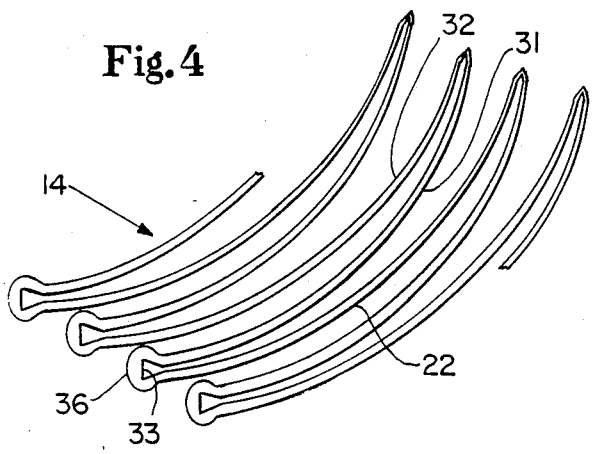
FIG. 4 is a greatly enlarged cross-sectional illustration of a portion of the collapsed bellows in the sidewall portion of the bottle shown in FIG. 3.

FIG. 3 illustrates bottle 10 in its collapsed condition. Product concentrate 50 preferably fills the reservoir portion 15 and the volume between the folded bellows. The lowermost inverted bellows portion of sidewall 14 normally defines the lower fill level 52 because of the air trapped between the inverted lowermost bellows leg and the sidewall of reservoir 15, i.e. area 51 in FIG. 3, unless special means are employed during filling, e.g, tilting the collapsed bottle during filling or collapsing the bottle after partially filling. The upper portion of reservoir 15 between the folded bellows is also available for storing concentrate 50, whether or not the concentrate enters between any of the collapsed bellows.

Lowermost hinge point 49 which is formed at the juncture between the sidewall of reservoir 15 and the lowermost bellows portion of sidewall 14 is preferably thinned by one of the processes described for the major diameter hinge points described in relation to FIGS. 2, 2A, or 2B.

Uppermost hinge point 48 performs a similar function at the junction of the periphery of uppermost portion 11 and the uppermost portion of sidewall 14. While orientation of the hinge point at the juncture of the periphery of uppermost portion 11 and the uppermost portion of sidewall 14 is non-critical, in the embodiment 10 illustrated in FIG. 1 uppermost hinge point 48 projects inwardly as earlier described in connection with FIG. 2A.

FIG. 4 illustrates a section of bottle 10 in the collapsed condition. Each bellows upper portion of leg (e.g. 32) is shown inverted and nested into the interior of each adjacent lower bellows portion or leg (e.g. 31). Each connecting hinge ring portion (e.g. 36) provides clearance at the minor diameter folds so that the inversion and nesting of the upper bellows portions or legs (e.g. 32) into the interior of the adjacent lower bellows portions or legs (e.g. 31) can be accomplished without interference and with little stress in the polymeric material comprising bottle 10. Because most polymers will creep under stress, the stresses within the collapsed bottle should be minimized if it is important for the expanded bottle to attain its original size and shape.

Thus, in bellows employed in expandble bottles of the present invention one of the curvilinear legs comprising the bellows is outwardly convex in both the collapsed and expanded condition of the bottle, while the other of said curviliner legs is outwardly convex in the expanded condition of the bottle, but inwardly convex in the collapsed condition of the bottle.

Connecting hinge ring portion 36 permits the use of similarly shaped adjoining bellows portions or legs which are of the same length or of about the same length, as measured along their cross-sections. Very high expanded volume to collapsed volume ratios are obtained when each individual upper bellows portion or leg (e.g. 32) is of similar shape and of equal or about equal length relative to its complement (e.g. 31) within the same bellows, i.e., relative to the bellows portion or leg to which it is joined at the major diameter.

To permit diluting and mixing of the concentrated product and handling and dispensing the diluted product, certain physical characteristics, such as axial and radial stiffness, are critical in the expanded bottle. These characteristics are achieved in expanded bottles of the present invention by translating the bottle material to a more distal location in the bellows relative to the vertical centerline of the bottle and by redirecting the bottle material to better resist the collapsing or buckling forces which act upon the sidewalls of the fully expanded bottle in use.

The following paragraphs describe the process which provides the above benefits in the context of a single typical bellows illustrated in FIGS. 5, 5A, and 5B. As those skilled in the art will appreciate, a similar process will occur in the other bellows portions of the bottle during the blow molding operation used to form bottle 10.

An extruded parison 510 of heated and softened polymer, such as polyethylene, is introduced into a blow mold 500 which has a cavity that corresponds to the outer surface of fully expanded bottle 10. Said parison is caused to expand radially. As shown in FIG. 5, the expanding parison contacts the portions of the mold used to form hinge ring surfaces 33 and 133, which in the illustrated embodiment is of slightly greater diameter, at about the same time. Since the surface of the mold immediately adjacent to the hinge ring surfaces 33 and 133 has a high radial component, the expanding parison 510 balloons into the bellows chamber which draws the polymer to a generally uniform thickness. Accordingly, the parison is able to expand well into the chamber of the bellows before the surfaces of the parison immediately above and below hinge ring surfaces 33 and 133 contact the mold 500.

In common molding practice, the mold is chilled to reduce cycle time. As a result, the hot and thus softened polymer is chilled and set upon contacting the mold surface. The curved form of the interior of the bellows mold permits more of the polymer to be translated further into the bellows mold and thus causes the volume of polymer to be more evenly distributed along the convex walls of the bellows portions ultimately formed therein.

Figure 6:
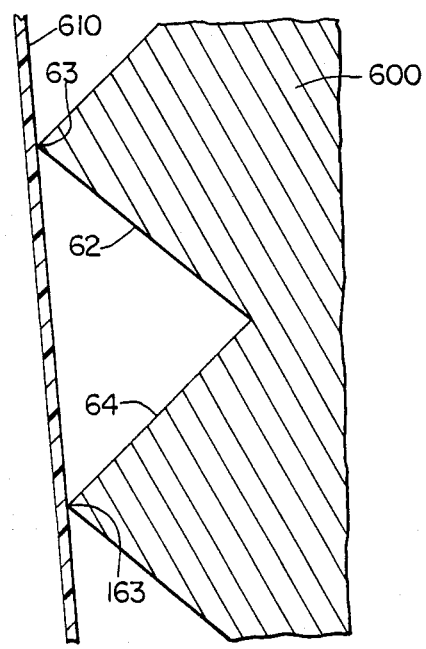
FIG. 6 is a simplified cross-sectional schematic generally similar to that of FIG. 5, but showing the condition which exists when the parison contacts the innermost surface of a prior art mold cavity utilized to make an expandable bottle having straight legged bellows of the prior art.
Figure 6A:
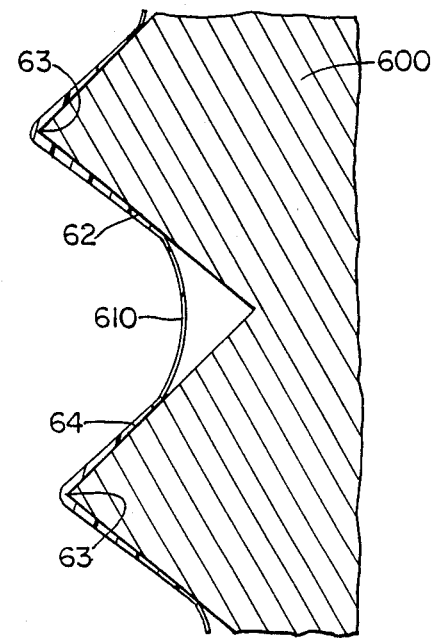
FIG. 6A is a view generally similar to that of FIG. 6, but showing the degree of conformance of the parison at a point prior to reaching its final configuration.
Figure 6B:
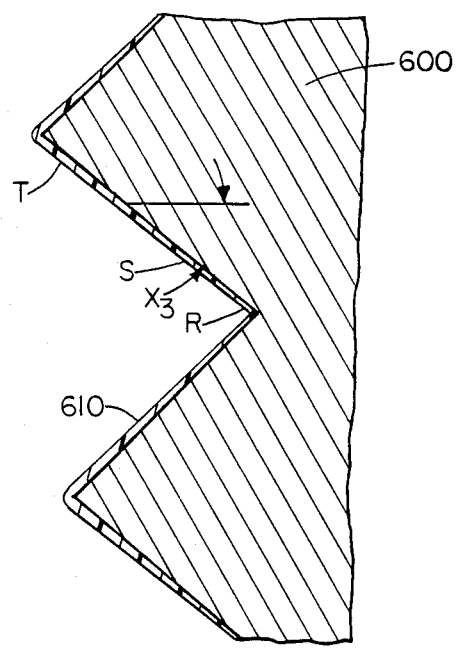
FIG. 6B is a view generally similar to that of FIGS. 6 and 6A, but showing the final configuration of the parison in the mold utilized to form an expandable bottle having straight legged bellows of the prior art.

This feature may be better appreciated when contrasted to the blow molding process utilized to form a straight legged prior art bellows, as illustrated in FIGS. 6, 6A, and 6B. In the prior art blow mold using a similar blow molding process, the expanding parison 610 contacts the surface of the mold 600 used to form innermost hinge points 63 and 163 at about the same time. The parison 610, being caused to further expand radially, balloons between the innermost hinge points 63 and 163 of the parison and quickly encounters portions 62 and 64 of the mold directly adjacent to innermost hinge points 63 and 163. As a result, a major portion of the volume of polymer is deposited near the minor diameter of the resultant prior art bellows. Accordingly, the polymer near the outermost major diameter of the resultant prior art bellows is drawn relatively thin. The resultant prior art bellows structure exhibits a generally stiff interior hinge with a progressively weaker section in the direction of its major diameter. Such bellows structures are employed in much of the prior art for the purpose of providing a spring action.

The outwardly convex bellows form of the present invention, on the other hand, has a more uniform distribution of polymer and provides a stiffer bottle for the same overall bottle weight. To demonstrate the improved distribution in the outwardly convex bellows, an exemplary bellows employing both configurations in a single structure was blow molded from polyethylene. One section of the bellows exhibited the approximate form shown in FIG. 5B. Typical thicknesses at points indicated as "J", "K", and "L" in FIG. 5B were 0.008", 0.015", and 0.020" respectively. Another section of the exemplary bellows exhibited the approximate form shown in FIG. 6B. The latter section was formed in a mold having identical vertical spacing and minor and major diameters to those used to form the convex bellows section described earlier herein. Typical dimensions at points "R", "S", and "T" in FIG. 6B (which correspond to points "J", "K", and "L", respectively, in the convex bellows section) were 0.004", 0.017", and 0.025", respectively.

In addition to improving the distribution of material to provide a more uniform cross-section, the convex bellows form of the present invention also aligns the material of the expanded bottle to better resist the collapsing or buckling forces to which the expanded bottle is subjected in use. Referring to FIG. 2, note that angle X is defined as the angle formed between the horizontal and a line tangent to the surface of the bellows. When the angle X is measured near the minor diameter, e.g., $X_1$, the angle is quite small. As the point of measurement for the angle X shifts outward along the curved bellows toward the major diameter, e.g., $X_2$, the angle increases significantly.

Because the angle X increases significantly in the direction of the major diameter for the outwardly convex bellows of the present invention, the material of the curved bellows bottle which is nearer the major diameter of the bellows is better aligned to resist vertical forces than the prior art bellows embodiment shown in FIG. 6B, wherein the angle X is substantially constant, i.e., $X_3$, at any point between the minor and major diameters of the straight legged bellows.

In general, when diluent is introduced into an expandable bottle for dilution or reconstitution, the increasing weight tends to stretch the bottle if the bottle is supported near the neck. If the bottle is supported by the base while the diluent is introduced into the bottle, the expansion of volume will not be realized. The increased axial stiffness of the convex bellows bottle of the present invention improves the accuracy of dilution when using the fill line or lines provided on the bottle. This is due to the fact that convex bellows bottles of the present invention better resist extension when diluent is added thereto. Therefore there is little difference in volume when expandable bottles of the present invention are filled while supporting them by the region near the neck versus supporting them by or near the base.

When a bottle is rotated as during pouring or dispensing of all or a portion of its contents, the bending moment is greatest at the points most distal from the vertical axis of the bottle. The more vertical arrangement of the material of the curved bellows bottle of the present invention, as described in the preceding paragraphs, better resists this buckling force. By way of contrast, the extreme thinning of the straight legs comprising the prior art bellows in the direction of the bottle's major diameter and the more horizontal orientation of its legs make the prior art straight legged bellows shown in FIG. 6 poorly suited to resist both vertical forces and buckling forces normally encountered in use.

Figure 7:
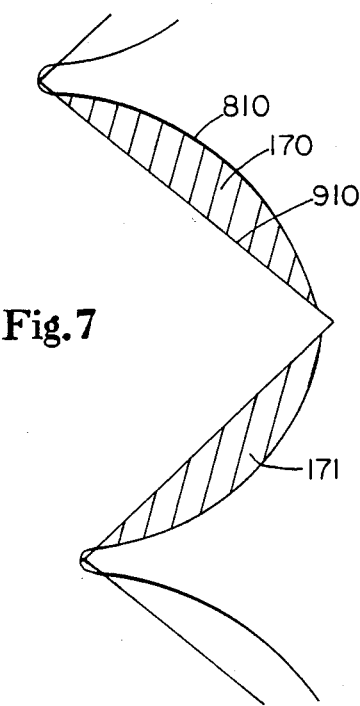
FIG. 7 is a schematic illustration depicting the increased volume provided by the outwardly convex bellows of the present invention relative to a prior art straight legged bellows of comparable dimension.

Still another benefit of the convex bellows bottle of the present invention is an increase in internal volume for the same external bottle dimensions. This difference is illustrated schematically in FIG. 7. Areas 170 and 171 represent the increase in internal volume of an outwardly convex bellows of the present invention (outline 810) over an otherwise similar straight legged bellows execution of the prior art (outline 910).

In another aspect, the present invention provides improved closure means for sealing the orifice in any expandable bottle, regardless of configuration. Said means preferably comprises a releasably secured closure which includes a self-venting feature which will permit expansion of the bottle without need to loosen or remove the closure from the bottle.

Figure 8:
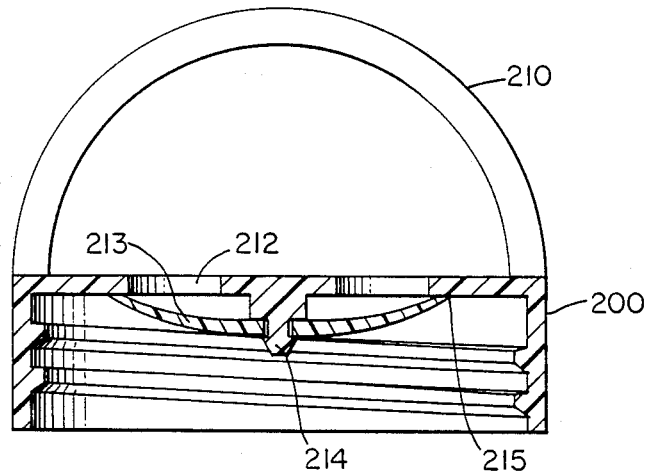
FIG. 8 is a simplified cross-sectional illustration of a particularly preferred self-venting closure of the present invention.

FIG. 8 illustrates a cross-sectional view of a particularly preferred self-venting screw-on cap 200 which can be used with expandable bottles of the present invention. Self-venting cap 200 includes vent holes 212 which permit air to enter the bottle upon expansion of the bottle. Attached to cap 200 by means of barbed nib 214 is resiliently deformable check valve 213. Check valve 213 makes a liquid tight seal at sealing surface 215. Check valve 213 prevents liquid from escaping the bottle even if the bottle is vigorously shaken to thoroughly mix the concentrate and diluent, yet readily permits air to enter upon expansion of the bottle.

Other means besides the check valve 213, such as a removable plug, refastenable tape, or a flexible seal of another design may be employed to provide venting upon expansion. Similarly, means other than screw threads may be employed to secure the cap and bottle to one another in a normally closed condition.

Self-venting cap 200 is illustrated with an integral pull strap 210. The upper pull strap may also be molded integrally to the expandable bottle. However, other means such as a separate pull strap attached either to the cap or to the expandble bottle by means of molded lugs, heat seal, or adhesive, may be employed to provide an uppermost handle or pull strap.

The outwardly convex bellows bottle of the present invention is particularly well suited for storing and delivering highly concentrated fruit juice concentrates, e.g., orange juice. Orange juice which has been concentrated by evaporation of water to a sufficiently high sugar content is a semifluid or slush at normal freezer temperatures, which are typically in the range of about −10° F. to about +10 F. The expandable convex bellows bottle of the present invention provides a simple means for accurately reconstituting such a highly concentrated product. After expansion of the bottle with its included concentrate, the user need only fill to a specified line. By way of contrast, prior art systems which remove the concentrate from its original container prior to diluting it normally require multiple additions of water from the original container. This is not only inconvenient, but inaccurate reconstitution often results.

In addition to slush concentrates, dry powder concentrates such as tea, or frozen concentrates, such as lower concentration fruit juices, can also be employed to great advantage in conjunction with bistable expandable bottles of the present invention. The frozen concentrates, of course, require somewhat more effort and/or time to undergo dilution than the slush or powdered concentrates. This may be accelarated by shaking the filled and sealed bottle, preferably with its closure sealingly secured across the expanded bottle's orifice.

When used with a concentrate which is intended to be stored in the freezer, an outwardly convex bellows bottle of the present invention is preferably comprise of polyethylene. Polyethelyne remains tough at freezer temperatures and because its Glass-Transition temperature is about −193° F. it also remains flexible at normal freezer temperatures. The property of remaining flexible at normal freezer temperatures is important if it is desired to remove the expandable bottle and the concentrate contained therein from the freezer, immediately expand the bottle, and then dilute the concentate for consumption. Because polyethylene is also quite flexible at room temperature when compared to other common polymers, prior art straight legged bellows bottles normally tend to buckle when subjected to handling and dispensing activities. However, the improved stiffness and material distribution provided by the outwardly convex bellows of the present invention help to overcome this buckling tendency.

The more uniform distribution of polymer material throughout the outwardly convex bellows of the present invention when compared to prior art straight legged bellows also results in a lower force being required to invert the outwardly convex bellows during the bottle expansion process.

When the contents of the bistable expandable bottle are finally consumed, the outwardly convex bellows of the expanded bottle can again be collapsed for efficient disposal by applying axial forces thereto.

While particular embodiments of the present invention have been illustrated and described, it will be obvious to those skilled in the art that various changes and modifications can be made without departing from the spirit and scope of the present invention, and it is intended to cover in the appended claims all such modifications that are within the scope of this invention.

What is claimed is:

1. A bistable bottle for storage of a concentrated material to be diluted within said bottle and dispensed in diluted form directly therefrom, said bottle being capable of maintaining either a collapsed condition or an expanded condition until is is acted upon by an external force applied in a direction substantially parallel to the vertical axis of said bottle, said bottle exhibiting improved resistance to both expansion and collapse when said bottle is in its expanded condition, said bottle comprising:
   (a) a lowermost portion;
   (b) an uppermost portion, said uppermost portion including an orifice for introducting concentrated material and diluent into said bottle and for dispensing diluted material from said bottle; and
   (c) a resilient, continuous sidewall portion having its lowermost end sealingly secured to said lowermost portion of said bottle and its uppermost end sealingly secured to said uppermost portion of said bottle, said continuous sidewall portion comprising a multiplicity of bellows, each of said bellows being sealingly interconnected to the adjacent bellows by means of a hinge ring which defines a minor diameter of said bottle sidewall portion, each of said bellows comprising a pair of curvilinear legs joined to one another an an outermost hinge point substantially coinciding with the major diameter of said bellows, said curvilinear legs comprising said bellows gradually tapering from a maximum thickness at their points of joinder to their respective hinge rings to a minimum thickness at said outermost hinge point, each of said hinge rings interconnecting adjacent bellows comprising a discrete wall segment of sufficient height to permit collapse of said bottle without causing interference between the curvilinear legs to which the ends of said hinge ring are sealingly secured, said points of securement between said hinge ring and said curvilinear legs being thinner than the adjacent portion of said hinge ring and the curvilinear leg to which it is sealingly secured, thereby defining a pair of innermost hinge points substantially coinciding with the minor diameter of said bottle sidewall for each of said hinge rings, each of said curvilinear legs exhibiting its maximum horizontal orientation immediately adjacent said hinge rings and its maximum vertical orientation immediately adjacent said outermost hinge points, one of said curvilinear legs being outwardly convex relative to the interior of said bottle in both the collapsed and expanded condition of said bottle and the other of said curvilinear legs being outwardly convex relative to the interior of said bottle in the expanded condition of said bottle, but inwardly convex relative to the interior of said bottle in the collapsed condition of said bottle, said bottle exhibiting improved resistance to both expansion and collapse while in its expanded condition due to the maximum vertical alignment of each pair of said curvilinear legs immediately adjacent the outermost hinge point joining said pair of curvilinear legs to one another.

2. The bistable bottle of claim 1, wherein said lowermost portion of said bottle includes a reservoir to house said concentrated material.

3. The bistable bottle of claim 1, wherein said uppermost portion of said bottle includes a reservoir to house said concentrated material.

4. The bistable bottle of claim 1, wherein said outermost hinge point joining said pair of curvilinear legs to one another comprises the thinnest point along either of said curvilinear legs comprising said bellows.

5. The bistable bottle of claim 4, wherein said outermost hinge point of said bellows comprises a discrete, outwardly convex radial segment having each of its end points sealingly secured to one of said curvilinear legs comprising said bellows at a point substantially coinciding with the major diameter of said bellows.

6. The bistable bottle of claim 4, wherein said outermost hinge point of said bellows comprises an outwardly oriented vertex formed by a pair of intersecting straight legged segments, each of said straight legged segments having its innermost end sealingly secured to one of said curvilinear legs comprising said bellows at a point substantially coinciding with the major diameter of said bellows.

7. The bistable bottle of claim 4, wherein said outermost hinge point of said bellows comprises an inwardly oriented vertex formed by a pair of intersecting straight legged segments, each of said straight legged segments having its outermost end sealingly secured to one of said curvilinear legs comprising said bellows at a point substantially coinciding with the major diameter of said bellows.

8. The bistable bottle of claim 1, wherein each of said hinge rings inteconnecting adjacent bellows comprises a discrete wall segment oriented substantially parallel to the vertical axis of said bottle, each end of said hinge ring being sealingly secured to one of said adjacent bellows at a point.

9. The bistable bottle of claim 1, wherein said resilient sidewall portion of said bottle is comprised of molded polymeric material.

10. The bistable bottle of claim 9, wherein said entire bottle is comprised of molded polymeric material.

11. The bistable bottle of claim 10, wherein said polymeric material remains resilient at freezer temperatures as low as about −10° F.

12. The bistable bottle of claim 11, wherein said polymeric material is comprised of polyethylene.

13. The bistable bottle of claim 9, wherein said polymeric material is comprised of polypropylene.

14. The bistable bottle of claim 1, including handle means secured to said lowermost portion of said bottle and handle means secured to the uppermost portion of said bottle, said handle means permitting the user to easily expand said bottle from its collapsed to its expanded condition by applying tension to said opposing handle means with opposing hands.

15. The bistable bottle of claim 14, wherein one of said handles is integrally formed with the bottom surface of said expandable bottle, said bottom surface of said bottle exhibiting a recessed base in which said handle can be stowed, said recessed base including latching means to retain said handle in a stowed position prior to and after expansion of said bottle to its expanded condition.

16. The bistable bottle of claim 15, wherein said latching means comprises a projection in the base of said bottle, said projection serving to restrain said handle in a stowed position until said handle is grasped by the user.

17. The bistable bottle of claim 1, including closure means which is sealingly securable to the orifice in said uppermost portion of said bottle.

18. The bistable bottle of claim 17, including venting means in said closure means to admit air into said bottle only when said bottle is expanded, whereby said bottle can be expanded without removing said closure means therefrom.

19. The bistable bottle of claim 17, wherein said lowermost portion of said bottle includes handle means secured thereto and said closure means includes handle means secured thereto, whereby said bottle can be easily expanded from its collapsed condition by applying tension to said opposing handle means with opposing hands.

20. The bistable bottle of claim 1, wherein said cross-section of said sidewall portion of said bottle, as measured perpendicular to the vertical axis of said bottle, is curvilinear about its entire periphery.

21. The bistable bottle of claim 20, wherein said cross-section of said sidewall portion of said bottle, as measured perpendicular to the vertical axis of said bottle, is circular.

22. A bistable bottle for storage of a concentrated material to be diluted within said bottle and dispensed in diluted form directly therefrom, said bottle being blow molded from polymeric material and capable of maintaining either a collapsed condition or an expanded condition until it is acted upon by an external force applied in a direction substantially parallel to the vertical axis of said bottle, said bottle exhibiting improved resistance to both expansion and collapse when said bottle is in its expanded condition, said bottle comprising:

(a) a lowermost portion including a reservoir to house said concentrated material;

(b) an uppermost portion, said uppermost portion including an orifice for introducing concentrated material and diluent into said bottle and for dispensing diluted material from said bottle; and (c) a resilient, continuous sidewall portion having its lowermost end sealingly secured to said lowermost portion of said bottle and its uppermost end sealingly secured to said uppermost portion of said bottle, said continuous sidewall portion comprising a multiplicity of bellows, each of said bellows being sealingly interconnected to the adjacent bellows by means of a hinge ring which comprises a discrete wall segment defining a minor diameter of said bottle sidewall portion, each of said bellows comprising a pair of curvilinear legs joined to one another at an outermost hinge point substantially coinciding with the major diameter of said bellows, said curvilinear legs comprising said bellows gradually tapering from a maximum thickness at their points of joinder to their respective hinge rings to a minimum thickness at said outermost hinge point, each of said hinge rings interconnecting adjacent bellows comprising a discrete wall segment of sufficient height to permit collapse of said bottle without causing interference between the curvilinear legs to which the ends of said hinge ring are sealingly secured, said points of securement between said hinge ring and said curvilinear legs being thinner than the adjacent portion of said hinge ring and the curvilinear leg to which it is sealingly secured, thereby defining a pair of innermost hinge points substantially coinciding with the minor diameter of said bottle sidewall for each of said hinge rings, each of said curvilinear legs exhibiting its maximum horizontal orientation immediately adjacent said hinge rings and its maximum vertical orientation immediately adjacent said outermost hinge points, one of said curvilinear legs being outwardly convex relative to the interior of said bottle in both the collapsed and expanded condition of said bottle and the other of said curvilinear legs being outwardly convex relative to the interior of said bottle in the expanded condition of said bottle, but inwardly convex relative to the interior of said bottle in the collapsed condition of said bottle, said bottle exhibiting improved resistance to both expansion and collapse while in its expanded condition due to the maximum vertical alignment of each pair of said curvilinear legs immediately adjacent the outermost hinge point joining said pair of curvilinear legs to one another.

23. The bistable bottle of claim 22, wherein said outermost hinge point joining said pair of curvilinear legs to one another comprises the thinnest point along either of said curvilinear legs comprising said bellows.

24. The bistable bottle of claim 23, wherein said outermost hinge point of said bellows comprises a discrete, outwardly convex radial segment having each of its end points sealingly secured to one of said curvilinear legs comprising said bellows at a point substantially coinciding with the major diameter of said bellows.

25. The bistable bottle of claim 23, wherein said outermost hinge point of said bellows comprises an outwardly oriented vertex formed by a pair of intersecting straight legged segments, each of said straight legged segments having its innermost end sealingly secured to one of said curvilinear legs comprising said bellows at a point substantially coinciding with the major diameter of said bellows.

26. The bistable bottle of claim 23, wherein said outermost hinge point of said bellows comprises an inwardly oriented vertex formed by a pair of intersecting straight legged segments, each of said straight legged segments having its outermost end sealingly secured to one of said curvilinear legs comprising said bellows at a point substantially coinciding with the major diameter of said bellows.

27. The bistable bottle of claim 22, wherein the uppermost bellows in said continuous sidewall portion of said bottle is sealingly secured to the uppermost portion of said bottle at an uppermost hinge point which coincides with a minor diameter of said uppermost bellows and which is thinner than the immediately adjacent portions of said uppermost bellows and said uppermost portion of said bottle and wherein the lowermost bellows in said continuous sidewall portion is sealingly secured to the lowermost portion of said bottle at a lowermost hinge point which coincides with the major diameter of said lowermost bellows and which is thinner than the immediately adjacent portions of said lowermost bellows and said lowermost portion of said container.

28. The bistable bottle of claim 22, wherein each of said hinge rings interconnecting adjacent bellows comprises a discrete wall segment oriented substantially parallel to the vertical axis of said bottle.

29. The bistable bottle of claim 22, wherein said polymeric material remains resilient at freezer temperatures as low as about $-10°$ F.

30. The bistable bottle of claim 29, wherein said polymeric material is comprised of polyethylene.

31. The bistable bottle of claim 22, including handle means secured to said lowermost portion of said bottle and handle means secured to the uppermost portion of said bottle, said handle means permitting the user to easily expand said bottle from its collapsed to its expanded condition by applying tension to said opposing handle means with opposing hands.

32. The bistable bottle of claim 22, including closure means which is sealingly securable to the orifice in said uppermost portion of said bottle.

33. The bistable bottle of claim 32, including venting means in said closure means to admit air into said bottle only when said bottle is expanded, whereby said bottle can be expanded without removing said closure means therefrom.

34. The bistable bottle of claim 32, wherein said lowermost portion of said bottle includes handle means secured thereto and said closure means includes handle means secured thereto, whereby said bottle can be easily expanded from its collapsed condition by applying tension to said opposing handle means with opposing hands.

35. The bistable bottle of claim 22, wherein said cross-section of said sidewall portion of said bottle, as measured perpendicular to the vertical axis of said bottle, is circular.

36. In combination, a bistable bottle capable of maintaining either a collapsed condition or an expanded condition until it is acted upon by an external force applied in a direction substantially parallel to the vertical axis of said bottle and a concentrated material stored within said bottle while said bottle is in its collapsed condition, said bottle being capable of being manually expanded to permit dilution of said concentrate within said bottle and dispensing said diluted concentrate directly from said expanded bottle, said bottle exhibiting improved resistance to both expansion and collapse when said bottle is in its expanded condition, said combination comprising:

(a) a bottle, said bottle being comprised of polymeric material and having:
  (i) a lowermost portion;
  (ii) an uppermost portion, said uppermost portion including an orifice for introducing concentrated material and diluent into said bottle and for dispensing diluted material from said bottle; and
  (iii) a resilient, continuous sidewall potion having its lowermost end sealingly secured to said lowermost portion of said bottle and its uppermost end sealingly secured to said uppermost portion of said bottle, said continuous sidewall portion comprising a multiplicity of bellows, each of said bellows being sealingly interconnected to the adjacent bellows by means of a hinge ring which defines a minor diameter of said bottle sidewall portion, each of said bellows comprising a pair of curvilinear legs joined to one another at an outermost hinge point substantially coinciding with the major diameter of said bellows, said curvilinear legs comprising said bellows, gradually tapering from a maximum thickness at their points of joinder to their respective hinge rings to a minimum thickness at said outermost hinge point, each of said hinge rings interconnecting adjacent bellows comprising a discrete wall segment of sufficient height to permit collapse of said bottle without causing interference between the curvilinear legs to which the ends of said hinge ring are sealingly secured, said points of securement between said hinge ring and said curvilinear legs being thinner than the adjacent portion of said hinge ring and the curvilinear leg to which it is sealingly secured, thereby defining a pair of innermost hinge points substantially coinciding with the minor diameter of said bottle sidewall for each of said hinge rings, each of said curvilinear legs exhibiting its maximum horizontal orientation immediately adjacent said hinge rings and its maximum vertical orientation immediately adjacent said outermost hinge points, one of said curvilinear legs being outwardly convex relative to the interior of said bottle in both the collapsed and expanded condition of said bottle and the other of said curvilinear legs being outwardly convex relative to the interior of said bottle in the expanded condition of said bottle, but inwardly convex relative to the interior of said bottle in the collapsed condition of said bottle, said bottle exhibiting improved resistance to both expansion and collapse while in its expanded condition due to the maximum vertical alignment of each pair of said curvilinear legs immediately adjacent the outermost hinge point joining said pair of curvilinear legs to one another; and (b) a concentrated material stored in said bottle while said bottle is in a collapsed condition.

37. The combination of claim 36, including closure means which is sealingly secured to the orifice in said uppermost portion of said bottle.

38. The combination of claim 37, wherein said concentrated material comprises a dry material and said diluent comprises a liquid solvent for said concentrated material.

39. The combination of claim 38, wherein said concentrated material comprises a dry powder.

40. The combination of claim 38, wherein said concentrated material comprises a liquid.

41. The combination of claim 38, wherein said polymeric material comprising said bottle remains resilient at freezer temperatures as low as about −10° F.

42. The combination of claim 41, wherein said concentrated material comprises a frozen liquid.

43. The combination of claim 41, wherein said concentrated material comprises a slush at freezer temperatures as low as −10° F.

44. The combination of claim 43, wherein said concentrated material comprises a citrus juice slush.

45. The combination of claim 44, wherein said citrus juice slush comprises orange juice slush.

46. The combination of claim 36, wherein a pair of opposing handles are secured to opposing ends of said bottle, said opposing handles being aligned with one another along the axis of expansion of said expandable bottle, one of said handles being secured directly to the lowermost end of said expandable bottle and the other of said handles being secured to said closure which is sealingly secured to said orifice in the opposite end of said bottle, whereby said bottle can be easily expanded from its collapsed condition by applying tension to said opposing handles with opposing hands.

* * * * *

UNITED STATES PATENT AND TRADEMARK OFFICE
CERTIFICATE OF CORRECTION

PATENT NO. : 4,873,100

Page 1 of 2

DATED : October 10, 1989

INVENTOR(S) : ROBERT S. DIRKSING, RICHARD M. GIRARDOT, THEODORE P. MERZ

It is certified that error appears in the above-identified patent and that said Letters Patent is hereby corrected as shown below: On the title page:

In the "References Cited" Section insert the following references:

| | | | |
|---|---|---|---|
| Re. 32,379 | 3/24/87 | Touzani | 215/1C |
| 1,668,895 | 5/8/28 | Fulton | |
| 2,880,902 | 4/7/59 | Owsen | 220/8 |
| 2,899,110 | 8/11/59 | Parker | 222/215 |
| 3,201,111 | 8/17/65 | Afton | 267/1 |
| 3,409,224 | 11/5/68 | Harp et al. | 239/33 |
| 3,559,692 | 2/2/71 | Mantelet | 138/121 |
| 3,586,084 | 6/22/71 | Redmond | 150/5 |
| 3,587,937 | 6/28/71 | Childs | 222/213 |
| 3,908,704 | 9/30/75 | Clement et al. | 138/21 |
| 3,929,165 | 12/30/75 | Diebolt et al. | 138/21 |
| 4,044,836 | 8/30/77 | Martin et al. | 169/30 |

Foreign Patent Documents

| | | |
|---|---|---|
| 1,296,900 | 6/4/69 | Fed. Rep. of Germany |
| 2,109,247 | 6/2/83 | Great Britain |
| 2,138,525 | 10/24/84 | Great Britain |

Column 2, line 19, "expanded" should read -- expandable -- .

Column 2, line 53, "movement" should read -- moment -- .

Column 3, line 51, "betwen" should read -- between -- .

Column 4, line 33, delete "is" second occurrence.

Column 7, line 41, "of" should read -- or -- .

Column 7, line 54, "expandble" should read -- expandable -- .

Column 10, line 51, "+10F" should read -- +10°F -- .

Column 11, line 5, "comprise" should read -- comprised -- .

Column 11, line 44, "is" first occurrence, should read -- it -- .

UNITED STATES PATENT AND TRADEMARK OFFICE
CERTIFICATE OF CORRECTION

PATENT NO. : 4,873,100

DATED : October 10, 1989

INVENTOR(S) : ROBERT S. DIRKSING, RICHARD M. GIRARDOT, THEODORE P. MERZ

It is certified that error appears in the above-identified patent and that said Letters Patent is hereby corrected as shown below:

Column 11, line 65, "an" first occurrence should read -- at -- .

Column 16, line 13, "potion" should read -- portion -- .

Column 17, line 16, after "as" second occurrence insert -- about -- .

Signed and Sealed this

Twelfth Day of February, 1991

Attest:

HARRY F. MANBECK, JR.

Attesting Officer

Commissioner of Patents and Trademarks